US009105372B2

(12) United States Patent
Gane et al.

(10) Patent No.: US 9,105,372 B2
(45) Date of Patent: Aug. 11, 2015

(54) AQUEOUS SUSPENSIONS OF CALCIUM CARBONATE-COMPRISING MATERIALS WITH LOW DEPOSIT BUILT UP

(71) Applicant: Omya International AG, Oftringen (CH)

(72) Inventors: Patrick A. C. Gane, Rothrist (CH); Samuel Rentsch, Aarburg (CH); Matthias Burl, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/240,824

(22) PCT Filed: Nov. 6, 2012

(86) PCT No.: PCT/EP2012/071905
§ 371 (c)(1),
(2) Date: Feb. 25, 2014

(87) PCT Pub. No.: WO2013/068334
PCT Pub. Date: May 16, 2013

(65) Prior Publication Data
US 2014/0299823 A1    Oct. 9, 2014

Related U.S. Application Data

(60) Provisional application No. 61/561,299, filed on Nov. 18, 2011.

(30) Foreign Application Priority Data

Nov. 11, 2011   (EP) .................................... 11188758

(51) Int. Cl.
C08K 3/26     (2006.01)
H01B 1/12     (2006.01)
C02F 1/52     (2006.01)
C09D 5/24     (2006.01)
C02F 1/56     (2006.01)
C02F 5/10     (2006.01)

(52) U.S. Cl.
CPC ................ *H01B 1/125* (2013.01); *C02F 1/529* (2013.01); *C02F 1/5245* (2013.01); *C09D 5/24* (2013.01); *C02F 1/56* (2013.01); *C02F 5/10* (2013.01); *C02F 2305/04* (2013.01)

(58) Field of Classification Search
USPC ......................................................... 524/425
See application file for complete search history.

(56) References Cited

U.S. PATENT DOCUMENTS

| 5,171,409 A | 12/1992 | Barnier et al. |
| 6,387,176 B1 | 5/2002 | Widmer et al. |
| 6,777,517 B1 | 8/2004 | Albrecht et al. |
| 7,335,700 B2 | 2/2008 | Yeung et al. |
| 2009/0199741 A1 | 8/2009 | Bleibler et al. |
| 2011/0031652 A1 | 2/2011 | Fisher et al. |
| 2011/0158890 A1* | 6/2011 | Gane et al. ................... 423/432 |

FOREIGN PATENT DOCUMENTS

| EP | 0736553 A2 | 10/1996 |
| EP | 1136508 A1 | 9/2001 |
| EP | 1138697 A1 | 10/2001 |
| EP | 2157136 A1 | 2/2010 |
| WO | 0077058 A1 | 12/2000 |
| WO | 2004041882 A1 | 5/2004 |
| WO | 2004041883 A1 | 5/2004 |
| WO | 2005111160 A1 | 11/2005 |
| WO | 2010018432 A2 | 2/2010 |
| WO | 2011028817 A1 | 3/2011 |

OTHER PUBLICATIONS

International Search Report dated Feb. 27, 2013 for PCT Application No. PCT/EP2012/071905.
Written Opinion of the International Searching Authority dated Feb. 27, 2013 for PCT Application No. PCT/EP2012/071905.

* cited by examiner

*Primary Examiner* — Hui Chin
(74) *Attorney, Agent, or Firm* — Amster, Rothstein & Ebenstein LLP

(57) ABSTRACT

The present invention concerns an anti-deposit additive and a deposit and/or corrosion reducing aqueous slurry containing a calcium carbonate containing material. In particular, the present invention is directed to the use of at least one anionically charged comb polymer as an anti-deposit agent in an aqueous slurry comprising a calcium carbonate containing material.

28 Claims, No Drawings

AQUEOUS SUSPENSIONS OF CALCIUM CARBONATE-COMPRISING MATERIALS WITH LOW DEPOSIT BUILT UP

CROSS-REFERENCE TO RELATED APPLICATIONS

This application is a U.S. national phase of PCT Application No. PCT/EP2012/071905, filed Nov. 6, 2012, which claims priority to European Application No. 11188758.4, filed Nov. 11, 2011 and U.S. Provisional Application No. 61/561,299, filed Nov. 18, 2011.

The present invention relates to aqueous suspensions of calcium carbonate containing material, and more specifically to aqueous suspensions of calcium carbonate containing materials forming a reduced amount of deposits on an electrically conductive surface when the slurry is in contact with electrically conductive surfaces having different electrode potentials or is exposed to a direct-current (DC) electrical field.

Freshly ground, non-dispersed, calcium carbonate has a weakly positive charged surface and a pH value of about 8 to 9. However, in the preparation of aqueous suspensions of calcium carbonate containing materials, the skilled person is often required to select and introduce additives in order to regulate one or more characteristics of these suspensions. For example, high solid content suspensions can only be processed if a corresponding dispersant is added. In making the additive selection, the skilled person must bear in mind that this additive should remain cost efficient and should not lead to unwanted interactions or effects downstream during the transportation, processing and application of the suspensions.

The addition of a dispersant such as a sodium polyacrylate or sodium polyphosphate inter alia affects the surface charge of the calcium carbonate particles in the suspension in that it generates negative charges on the particles. This effect can be used to separate the solid particles from the suspension as described in U.S. Pat. No. 5,171,409.

However, such dispersed calcium carbonate comprising suspensions can cause serious troubles during their production, storage, and transport. Production facilities or storage facilities involved in the preparation and storage of calcium carbonate comprising suspensions such as grinding mills or storage tanks usually consist of different steel qualities or alloys. Welding joints, for example, often have different alloys than the main steel quality used. Rods in a steel rod mill have a different steel quality than the wall of the mill. If such a calcium carbonate comprising suspension with negatively charged solid particles is in contact with two or more dissimilar metals or alloys having different standard electrode potentials, a galvanic couple can be set up which leads to the formation of deposits of calcium carbonate on the more anodic metal.

Furthermore, electrical potential differences cannot only occur due to different metal qualities, but also due to badly earthed electrically driven equipment, such as electro-motors for tank stirrers. For example, when moving a stirrer in a storage tank by an electrically driven motor, leakage or stray current may flow from the motor through the suspension to the tank wall forming an electrical potential difference. Often it is not possible to avoid such potential differences by changing steel quality or replacing electrical equipment. However, even more often such potential differences are not observed or it is not known at all that such potential differences exist.

The formation of deposits in turn can promote corrosion of the more anodic metal and may lead to discolouring of the suspension due to iron oxides produced by corrosion of ferrous metal. This problem is getting worse with increasing solid content of a calcium carbonate comprising suspension, and is especially pronounced in calcium carbonate comprising suspensions with a high solid content, i.e. suspensions having a solid content of more than 45 wt.-% based on the total weight of the suspension.

One possibility known in the art to control and overcome such an electrochemical reaction is the adjustment of the pH value of the suspension. However, pH adjustment in calcium carbonate comprising material suspensions may lead to unwanted effects such as flocculation, viscosity increase and/or partial dissolution of acid sensitive material in the suspension. Therefore, pH adjustment is not an option to control or prevent formation of deposits on metal surfaces such as the walls or pipes of the production equipment or storage tank walls from calcium carbonate comprising suspensions.

WO 2004/041882 and WO 2004/041883 disclose weakly ionic aqueous suspensions of ground mineral matter such as calcium carbonate. A process to prepare precipitated calcium carbonate implementing low charge acrylate or maleinate containing comb polymers is described in WO 2010/018432.

Therefore, there is a need for additives that control, reduce, or prevent the formation of deposits from calcium carbonate comprising material slurries.

Accordingly, it is an object of the present invention to provide an additive that controls, reduces or prevents the formation of deposits on metal surfaces from an aqueous slurry comprising a calcium carbonate containing material, in particular, in case the suspension is in contact with different metal surfaces or is exposed to an electrical field which may be generated by the set up of a galvanic couple, leakage and/or stray current flows. It also would be desirable to provide an additive which reduces or prevents the metal corrosion by an aqueous slurry comprising a calcium carbonate containing material. Furthermore, it would be desirable to provide an additive which does not affect the other physical properties of the suspension, such as the electrical conductivity, in an unacceptable way. It would also be desirable to provide an additive which not only controls, reduces or prevents the formation of deposits and/or reduces or prevents the metal corrosion, but also modifies the viscosity of an aqueous slurry comprising a calcium carbonate containing material, and, thus, renders the addition of a dispersant moot.

Another object of the present invention is to provide an aqueous suspension or slurry comprising a calcium carbonate containing material having less or no tendency to form deposits on metal surfaces, in particular, in case the suspension is in contact with different metal surfaces and/or is exposed to an electrical field which may be generated by the set up of a galvanic couple, leakage and/or stray current flows. It would also be desirable to provide an aqueous slurry of a calcium carbonate containing material, which is fluid, and thus, can contain a very high amount of calcium carbonate solids.

The foregoing and other objectives are solved by the use of at least one anionically charged comb polymer as an anti-deposit agent in an aqueous slurry comprising a calcium carbonate containing material, wherein the at least one anionically charged comb polymer has a specific charge from −10 C/g to −250 C/g at pH 8, and wherein the electrical conductivity of the slurry comprising the at least one anionically charged comb polymer is less than 500 µS/cm at 25° C.

According to another aspect of the present invention, a deposit and/or corrosion reducing aqueous slurry is provided comprising a calcium carbonate containing material, and at least one anionically charged comb polymer, wherein the at least one anionically charged comb polymer has a specific charge from −10 C/g to −250 C/g at pH 8, wherein the Brookfield viscosity of the slurry is from 25 to 5 000 mPa·s at 20° C., and the electrical conductivity of the slurry is less than 500 µS/cm at 25° C.

According to still another aspect of the present invention, a method for producing a deposit and/or corrosion reducing aqueous slurry is provided comprising the steps of a) providing a calcium carbonate containing material,
b) providing water,
c) providing at least one anionically charged comb polymer, wherein the at least one anionically charged comb polymer has a specific charge from −10 C/g to −250 C/g at pH 8, and
d) contacting the calcium carbonate containing material of step a) with the water of step b),
e) contacting the polymer of step c) with the calcium carbonate containing material before and/or during and/or after step d)

wherein the at least one anionically charged comb polymer is added in an amount such that the conductivity of the obtained aqueous slurry is less than 500 µS/cm at 25° C.

According to still another aspect of the present invention, a method for producing calcium carbonate containing composite particles is provided comprising the steps a) to e) of the inventive method for producing a deposit and/or corrosion reducing aqueous slurry, and a further step f) of drying the obtained slurry of step e).

According to still another aspect of the present invention the use of the inventive deposit and/or corrosion reducing slurry in paper, plastics, paint, and/or agriculture applications is provided.

Advantageous embodiments of the present invention are defined in the corresponding sub-claims.

According to one embodiment the at least one anionically charged comb polymer has a specific charge from −10 C/g to −200 C/g at pH 8, preferably from −10 C/g to −150 C/g at pH 8, more preferably from −10 C/g to −135 g/C at pH 8, and most preferably from −10 C/g to −100 C/g.

According to one embodiment the calcium carbonate containing material is a ground calcium carbonate, a precipitated calcium carbonate, or a mixture thereof. According to another embodiment the calcium carbonate containing material has a weight median particle size $d_{50}$ from 0.1 to 100 µm, from 0.25 to 50 µm, or from 0.3 to 5 µm, preferably from 0.4 to 3.0 µm.

According to one embodiment the slurry has a solid content from 45 to 82 wt.-%, preferably from 60 to 78 wt.-%, more preferably from 70 to 78 wt.-%, based on the total weight of the aqueous slurry.

According to one embodiment the at least one anionically charged comb polymer comprises structural units of formula (I)

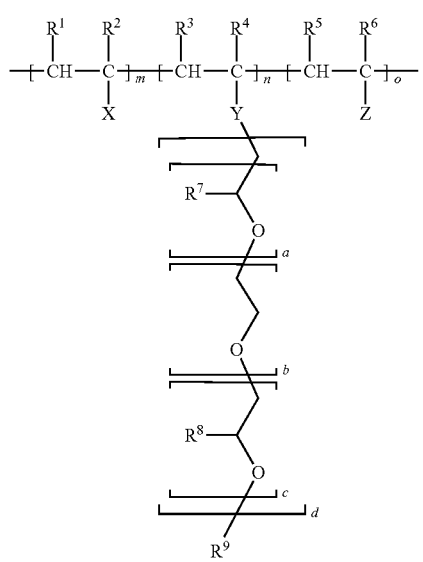

wherein $R^1$, $R^2$, $R^3$, $R^4$, $R^5$ and $R^6$ are independently selected from hydrogen or alkyl groups, preferably having 1 to 40 carbon atoms, X is a negatively charged functional group, Y represents a functional linkage group, which is independently selected from the group consisting of ether, ester, and amide groups, Z is a positively charged functional group, $R^7$ and $R^8$ are independently selected from hydrogen or alkyl groups having 1 to 4 carbon atoms, $R^9$ is selected from hydrogen or an alkyl group having 1 to 40 carbon atoms, a, b, c and d are integers having a value from 5 to 150, and at least one of a, b, c or d has a value of greater than 0, and n, m and o are selected so that the anionically charged polymer has a specific charge from −10 C/g to −250 C/g at pH 8. According to another embodiment the slurry comprises the at least one anionically charged comb polymer in amount from 0.01 to 10 wt.-%, based on the total weight of the solids in the slurry, preferably from 0.05 to 5 wt.-%, more preferably from 0.1 to 3 wt.-%, even more preferably from 0.2 to 2.0 wt.-%, and most preferably from 0.25 to 1.5 wt.-% or from 0.5 to 1.25 wt.-%.

According to one embodiment the Brookfield viscosity of the slurry comprising the at least one anionically charged comb polymer is from 25 to 5 000 mPa·s at 20° C., preferably from 50 to 2 000 mPa·s at 20° C., more preferably from 80 to 1 000 mPa·s at 20° C., and most preferably from 100 to 700 mPa·s at 20° C. According to another embodiment the electrical conductivity of the slurry comprising the at least one anionically charged comb polymer is from 50 to 500 µS/cm at 25° C., preferably from 70 to 300 µS/cm at 25° C., more preferably from 80 to 250 µS/cm at 25° C., and most preferably from 100 to 200 µS/cm at 25° C.

According to one embodiment the slurry comprising the at least one anionically charged comb polymer forms a reduced amount of deposits on an electrically conductive surface compared to a slurry not containing an anionically charged comb polymer but having the same solids content and viscosity when the slurry is in contact with at least two electrically conductive surfaces having different standard electrode potentials or is exposed to a direct-current (DC) electrical field for the same time period. According to another embodiment the slurry comprising the at least one anionically charged comb polymer forms an amount of deposits on an electrically conductive surface, which is less than 10 wt.-%, preferably less than 5 wt.-%, more preferably less than 2 wt.-%, and most preferably less than 1 wt.-% of the deposit amount formed by a slurry not containing an anionically charged comb polymer but having the same solids content and viscosity when the slurry is in contact with at least two electrically conductive surfaces having different standard electrode potentials or is exposed to a DC electrical field for the same time period. According to still another embodiment the slurry comprising the at least one anionically charged comb polymer does not form any deposits on an electrically conductive surface when the slurry is in contact with at least two electrically conductive surfaces having different standard electrode potentials or is exposed to a DC electrical field.

According to still another embodiment the DC voltage of the electrical field is from 1 to 50 mV and/or the amperage is from 0.1 to 250 mA.

According to one embodiment the slurry does not contain an additive having a specific charge of more than −250 C/g at pH 8.

According to one embodiment the at least one anionically charged comb polymer is present in the deposit and/or corrosion reducing aqueous slurry in an amount of from 0.01 to 10 wt.-%, based on the total weight of the solids in the slurry, preferably from 0.05 to 5.0 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%. According to another embodiment the aqueous slurry has a solid content from 45 to 82 wt.-%, preferably from 60 to 78 wt.-%, and more preferably from 70 to 78 wt.-%, based on the total weight of the aqueous slurry, in the deposit and/or corrosion reducing aqueous slurry.

According to one embodiment the at least one anionically charged comb polymer is added in an amount, so that the obtained aqueous slurry has a Brookfield viscosity from 25 to 5 000 mPa·s at 20° C. According to another embodiment the at least one anionically charged comb polymer is present in an amount of from 0.01 to 10 wt.-%, based on the total weight of the solids in the slurry, preferably from 0.05 to 5.0 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%.

For the purpose of the present invention, the term "calcium carbonate containing material" refers to a material that comprises at least 80 wt.-% calcium carbonate, based on the total weight of the calcium carbonate containing material.

The term "specific charge" refers to the amount of electric charges in a specific amount of a polymer and is specified in C/g at a pH value of 8. The specific charge can be determined by titration with a cationic polymer until the specific charge becomes zero at a pH value of 8.

"Conductivity" according to the present invention shall mean the electrical conductivity of an aqueous carbonate-comprising material suspension as measured according to the measurement method defined in the examples section here below. The conductivity is specified in μS/cm and may be measured at 25° C.

A "deposit" in the meaning of the present invention is an accumulation or build-up of solid material left on a surface. Preferably, the deposit may comprise calcium carbonate.

For the purpose of the present invention, the term "electrical field" refers to an electrical field that may be produced by any kind of electrical source or may be generated by the set up of a galvanic couple, leakage and/or stray current flows. Preferably, the electrical field is generated by the set up of a galvanic couple, wherein an aqueous slurry comprising a calcium carbonate containing material is in contact with two or more dissimilar metals, alloys, or other electrically conductive materials having different standard electrode potentials, e.g. different direct current (DC) standard electrode potentials. Another preferred form is an electrical field produced by introducing a kind of electrical direct current (DC) onto two separated conducting electrodes (e.g. metals) of the same source.

"Standard electrode potential" according to the present invention is determined at solute concentrations of 1 molar (M), gas pressures of 1 atmosphere, and a temperature of 25° C., using the standard hydrogen electrode as a reference electrode.

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionating, for example by a cyclone or classifier.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 μm, a Sedigraph 5120 device from the company Micromeritics, USA, can be used.

For the purpose of the present invention, the term "anionically charged comb polymer" refers to a comb-shaped polymer which is formed from a main chain, also referred to as back bone, to which carbonic acid groups and/or other acid groups are attached in the form of free acids or salts thereof, i.e. in a form of a carboxylate ion, as well as side chains comprising polyalkylene oxide, optionally end-caped with a hydrocarbon chain. The polyalkylene oxide side chains can be bonded to the main chain via ester bonds, amide bonds, or ether bonds. In addition to the carbonic acid groups and the polyalkylene oxide side chains, further functional or non-functional groups can be bonded to the main chain, e.g. positively charged functional groups such as a quaternary ammonium group. The term "anionically charged" as used in the present invention is to be understood to mean that the comb polymer has a total or net charge that is negative, i.e. the sum of all positive and negative charges is negative. In other words, the polymer must possess an excess of anionically charged functional groups or residues. This means that the anionically charged comb polymer of the present invention may comprise both positively and negatively charged functional groups or residues, i.e. cationic and anionic functional groups or residues, as long as the total or net charge is negative, i.e. the comb polymer is anionic. For example, the anionically charged comb polymer may comprise only anionically charged functional groups or residues or may comprise anionically and cationically charged functional groups or residues, and thus may have an amphoteric character.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be vaterite, calcite or aragonite.

A "suspension" or "slurry" in the meaning of the present invention comprises insoluble solids and water, and optionally further additives and usually contains large amounts of solids, and, thus, is more viscous and can be of higher density than the liquid from which it is formed.

For the purposes of the present invention, the term "viscosity" refers to Brookfield viscosity. According to the present invention the Brookfield viscosity is measured after 1 minute of stirring by the use of an RVT model Brookfield™ viscometer at a temperature of 20° C., and a rotation speed of 100 rpm (revolutions per minute) with the appropriate disc spindle No 1 to 5.

The Anionically Charged Comb Polymer

According to the present invention at least one anionically charged comb polymer is used as an anti-deposit agent in an aqueous slurry comprising a calcium carbonate containing material, wherein the anionically charged comb polymer has a specific charge from −10 C/g to −250 C/g at pH 8. The anionically charged comb polymer is a comb-shaped polymer which is formed from a main chain, also referred to as back bone, and side chains attached thereto.

The inventors surprisingly found that the use of at least one anionically charged comb polymer having an anionic specific charge from −10 C/g to −250 C/g at pH 8 in an aqueous slurry comprising a calcium carbonate containing material can reduce or prevent the formation of deposits and/or corrosion on metal surfaces from said slurry.

Such deposits may be formed when the slurry is in contact with electrically conductive surfaces such as metal surfaces having different standard electrode potentials, whereby a galvanic couple can be set up, and thus an electrical field is generated, or when the slurry is exposed to an electrical field that may result from applying a DC voltage, or leakage or direct stray current flows. Since the formation of deposits on a metal surface can in turn promote corrosion of this metal surface, the reduction or prevention of deposits may also reduce or prevent corrosion of the metal surface.

Furthermore, the inventors surprisingly found that the electrical conductivity of the slurry is not significantly changed by the addition of the inventive anionically charged comb polymer to high solids calcium carbonate slurry, but remains rather low.

Without being bound to any theory, it is believed that the anionically charged comb polymer is adsorbed to the weakly positively charged calcium carbonate particles due to its negatively charged main chain, also called polymer back bone. Furthermore, the side chains of the adsorbed anionically charged comb polymer cause a steric and/or osmotic repulsion between the particles, which may lead to a steric and/or osmotic stabilization of the calcium carbonate containing material slurry.

According to one embodiment, the use of at least one anionically charged comb polymer as an anti-deposit agent in an aqueous slurry comprising a calcium carbonate material leads to a slurry that forms a reduced amount of deposits on an electrically conductive surface, compared to the same slurry but without the use of at least an anionically charged comb polymer according to the invention, when the slurry is in contact with at least two electrically conductive surfaces having different standard electrode potentials or is exposed to a DC electrical field for the same time period.

According to one exemplary embodiment of the present invention, the slurry comprising the at least one anionically charged comb polymer forms an amount of deposits on an electrically conductive surface, which is less than 10 wt.-%, preferably less than 5 wt.-%, more preferably less than 2 wt.-%, and most preferably less than 1 wt.-% of the deposit amount formed by a slurry not comprising an anionically charged comb polymer according to the invention but having the same solids content and the same viscosity, when the slurry is in contact with at least two electrically conductive surfaces having different standard electrode potentials or is exposed to a DC electrical field for the same time period.

For example, the slurry may be in contact with at least two electrically conductive surfaces having different standard electrode potentials or may be exposed to a DC electrical field for a time period of 1 min, 5 min, 10 min, 30 min, 1 h, 12 h, 24 h, 48 h, one week, two weeks, or one month.

According to a preferred embodiment of the present invention, the slurry comprising the at least one anionically charged comb polymer does not form any deposits on an electrically conductive surface when the slurry is in contact with at least two electrically conductive surfaces having different standard electrode potentials or is exposed to a DC electrical field.

Examples of electrically conductive surfaces are surfaces comprising copper, stainless steel, brass, carbon steel, chrome steel alloys, or graphite. According to one embodiment of the present invention, at least one of the electrically conductive surfaces is a metal or metal alloy surface.

According to one embodiment of the present invention the electrical field is generated by the set up of a galvanic couple, a leakage current flow and/or a stray current flow. The voltage and amperage of the electrical field may vary depending on the source of the electrical field. According to one embodiment the DC voltage of the electrical field is from 1 to 50 mV, from 2 to 40 mV, from 5 to 35 mV, or from 10 to 20 mV, and/or the amperage is from 0.1 to 250 mA, from 1 to 150 mA, from 10 to 100 mA, or from 20 to 60 mA.

The main chain of the at least one anionically charged comb polymer may comprise copolymers of unsaturated mono- or dicarbonic acids or other acids, unsaturated carbonic acid esters, unsaturated carbonic acid amides, allyl esters or vinyl ethers. Alternatively, the main chain of the anionically charged comb polymer can be a carboxyl group containing polysaccharide derived polymer or other acid group containing polysaccharide derived polymer, preferably carboxymethyl cellulose.

The at least one anionically charged comb polymer used according to the present invention may be obtained by copolymerization of unsaturated mono or di-carbonic acids with unsaturated carbonic acid esters, unsaturated carbonic acid amides, allyl ethers or vinyl ethers, wherein the carbonic acids may be present in the form of the free acids and/or in the form of the salts thereof. Alternatively, the anionically charged comb polymer may be produced by means of polymer-analogous reactions, wherein a polymer comprising either latent or free carboxyl groups is reacted with one or more compounds comprising amine or hydroxyl functions under conditions that promote the partial amidization or, as the case may be, esterification of the carboxyl groups.

The side chains of the anionically charged comb polymer may comprise polymerized epoxide-containing compounds, such as, for example, ethylene oxide, propylene oxide, 1-butylene oxide, phenyl-ethylene oxide etc. It is preferred that the polyether side chains comprise polyethylene oxide or polypropylene oxide or a mixed copolymer comprising ethylene oxide and propylene oxide and have at their free end a hydroxyl group, a primary amino group or an alkyl group having between 1 and 40 carbon atoms, being straight-chain, branched or cyclical, preferably a straight chain alkyl group having between 1 and 4 carbon atoms. Such anionically charged comb polymers may have an intrinsic viscosity between 10 and 100 ml/g, preferably between 15 and 80 ml/g, and most preferably between 20 and 70 ml/g. The carbonic acid groups or other acid groups in the polymer can be partially or fully neutralized by alkali metals or alkaline earth metals or salts of other two or three valence electron metal ions, ammonium ions, organic ammonium groups or mixtures thereof.

Anionically charged comb polymers that may be used in the present invention are described in US 2009/0199741 A1, U.S. Pat. No. 6,387,176 B1, EP 1136508 A1, EP 1138697 A1, EP 1189955 A1, and EP 0736553 A1. These documents disclose processes to produce anionically charged comb polymer as well as their use in mineral based binders such as cement. Suitable anionically charged comb polymer are also described in the product brochure "SIKA ViscoCrete®, selbstverdickender Beton SCC" available on the website www.sika.com.

Synthetic polymers with anionic charge on the backbone and non-charged side chains as dispersing agent for fillers and pigments are available under the tradename MelPers® from BASF, Germany. Anchor groups with anionic and steric character in said synthetic polymers lead to effects which can be described as following an electrosterical dispersing mechanism. These dispersing agents are preferably used in nanoscale solid systems.

EP 1 761 609 B1 describes a comb-branched copolymer dispersant having an acrylic acid containing polymeric backbone and poly-(ethylene oxide-propylene oxide) side chains. The molecular weight of this additive is 90 000 g/Mol, the molecular weight of the polyalkylene oxide side chain is 3 000 g/Mol, and the ethylene oxide/propylene oxide ratio is 66.8/28.7

US 2011/031652 describes a commercially available comb-based copolymer which is an ethoxylated acrylic acid polymer as dispersant for gypsum. Further examples of such comb polymers can be found in WO 2011/028817.

In these documents, no mention is made of the use of such polymers as an anti-deposit additive in an aqueous slurry of a calcium carbonate containing material. To the contrary, these documents are mostly concerned with the preparation of concrete and gypsum. Therefore, the inventors were very surprised when they found out that such anionically charged comb polymers can be used as anti-deposit agents.

Further examples of anionically charged comb polymers that may be used as anti-deposit additives in the meaning of the present invention are polymers of the MELFLUX® dispersant series by BASF Construction Polymers, GmbH (Trostberg, Germany), ETHACRYL® M dispersant by CoAtex, LLC (Chester, S.C.), or MIGHTY EG® dispersant by Kao Specialties Americas, LLC, (High Point, N.C.).

According to one embodiment the at least one anionically charged comb polymer comprises structural units of formula (I)

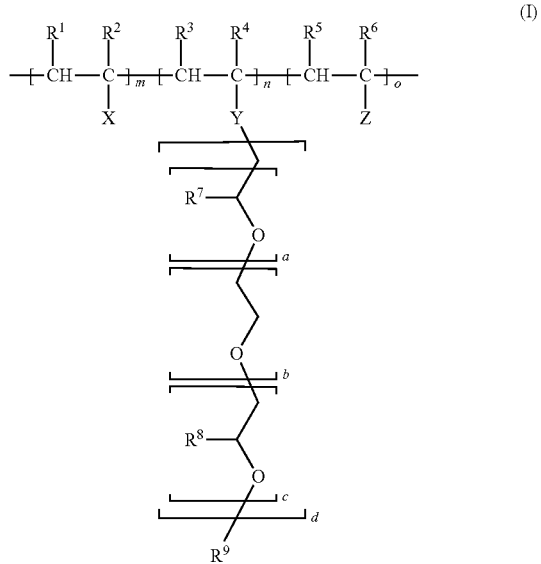

wherein $R^1$, $R^2$, $R^3$, $R^4$, $R^5$ and $R^6$ are independently selected from hydrogen or alkyl groups, preferably having 1 to 40 carbon atoms, X is a negatively charged functional group, Y represents a functional linkage group, which is independently selected from the group consisting of ethers, esters, and amides, Z is a positively charged functional group, $R^7$ and $R^8$ are independently selected from hydrogen or alkyl groups having 1 to 4 carbon atoms, $R^9$ is selected from hydrogen or an alkyl group having 1 to 40 carbon atoms, a, b, c, and d are integers having a value from 5 to 150, and at least one of a, b, c or d has a value of greater than 0, and n, m and o are selected so that the anionically charged polymer has a specific charge from −10 C/g to −250 C/g at pH 8.

Examples for alkyl groups having 1 to 40 carbon atoms are methyl, ethyl, n-propyl, isopropyl, n-butyl, sec.-butyl, tert.-butyl, isobutyl, n-pentyl, n-hexyl, dodecyl, octadecyl. The alkyl groups may be substituted by one or more substituents of the halogen group, e.g. F, Cl, or Br, and/or one or more substituents of the acryloxy, amino, amide, aldehyde, carboxy, cyano, epoxy, hydroxyl, ketone, methacryloxy, mercapto, phosphoric acid, sulfonic acid or vinyl groups.

According to one embodiment of the present invention, $R^1$, $R^2$, $R^3$, $R^4$, $R^5$ and $R^6$ are independently selected from hydrogen or alkyl groups having 1 to 20 carbon atoms, preferably 1 to 10 carbon atoms, and more preferably 1 to 6 carbon atoms. According to a preferred embodiment, $R^1$, $R^2$, $R^3$, $R^4$, $R^5$ and $R^6$ are independently selected from hydrogen or methyl. According to another embodiment of the present invention $R^1$, $R^3$, $R^5$ are hydrogen. According to still another embodiment of the present invention one or more of $R^1$, $R^3$, $R^5$ is X.

According to one embodiment of the present invention X comprises ester, amide, or ether functions. According to a preferred embodiment of the present invention, X is selected from the group consisting of phosphoric acid, phosphonic acid, sulfuric acid, sulfonic acid, carboxylic acid groups and mixtures thereof.

According to one embodiment of the present invention, Y represents a functional linkage group which is independently selected from the group consisting of phosphoric ester, phosphonic ester, sulfuric ester, sulfonic ester, carboxylic ester, phosphoric amide, phosphonic amide, sulfuric amide, sulfonic amide and carboxylic amide groups.

According to one embodiment of the present invention, Z represents a quaternary ammonium group.

According to one embodiment of the present invention, $R^9$ is a linear or branched alkyl chain having 1 to 28, preferably 1 to 18, more preferably 1 to 6, and most preferably 1 to 3 carbon atoms. According to a preferred embodiment, $R^9$ is hydrogen or methyl.

According to one embodiment, a and/or b and/or c has a value from 7 to 120. According to another embodiment of the present invention, a, b, c and d are selected such that $5 \leq (a+b+c) \cdot d \leq 150$, preferably such that $10 \leq (a+b+c) \cdot d \leq 80$.

According to one embodiment of the present invention, the at least one anionically charged comb polymer comprises at least 90 Mol-% of structural units of formula (I), preferably at least 95 Mol-%, more preferably at least 98 Mol-%, and most preferably 99 Mol-%, based on the total amount of structural units of the anionically charged comb polymer. According to another embodiment of the present invention, the anionically charged comb polymer consists of structural units of formula (I).

According to one embodiment of the present invention, the at least one anionically charged comb polymer features an intrinsic viscosity of less than or equal to 100 ml/g, preferably from 10 to 100 ml/g, more preferably from 15 to 80 ml/g, and most preferably from 20 to 70 ml/g, as determined by the method described in the examples.

The at least one anionically charged comb polymer of the present invention has a specific charge from −10 C/g to −250 C/g at pH 8. According to one embodiment of the present invention, the anionically charged comb polymer has a specific charge from −10 C/g to −200 C/g, preferably from −10 C/g to −150 C/g, more preferably from −10 C/g to −135 C/g, and most preferably from −10 C/g to −100 C/g, measured at pH 8.

According to the present invention, the expression "at least one" anionically charged comb polymer means that one or more anionically charged comb polymers may be used as an anti-deposit agent in the aqueous slurry comprising the calcium carbonate containing material. According to one embodiment, only one anionically charged comb polymer is used as an anti-deposit agent in the aqueous slurry comprising the calcium carbonate containing material. According to another embodiment, a mixture of at least two anionically charged comb polymers is used as an anti-deposit agent in the aqueous slurry comprising the calcium carbonate containing material.

The at least one anionically charged comb polymer of the present invention is used as an anti-deposit agent in an aqueous slurry comprising a calcium carbonate containing material, wherein the electrical conductivity of the slurry comprising the at least one anionically charged comb polymer is less than 500 µS/cm at 25° C.

According to one embodiment, the electrical conductivity of the slurry comprising the at least one anionically charged comb polymer is from 50 to 500 µS/cm at 25° C., preferably from 70 to 300 µS/cm at 25° C., more preferably from 80 to 250 µS/cm at 25° C., and most preferably from 100 to 200 µS/cm at 25° C.

According to one embodiment, the Brookfield viscosity of the slurry comprising the at least one anionically charged comb polymer is from 25 to 5 000 mPa·s at 20° C., preferably from 50 to 2 000 mPa·s at 20° C., more preferably from 80 to 1 000 mPa·s at 20° C., and most preferably from 100 to 700 mPa·s at 20° C. Preferably the slurry has a Brookfield viscosity from 25 to 5 000 mPa·s measured after 1 min of stirring at a rotation speed of 100 rpm and at a temperature of about 20° C. More preferably the slurry has a Brookfield viscosity from 80 to 1 000 mPa·s or from 100 to 700 mPa·s measured after 1 min of stirring at a rotation speed of 100 rpm and at a temperature of about 20° C.

The at least one anionically charged comb polymer may be used in the aqueous slurry in an amount from 0.01 to 10 wt.-%, based on the total weight of the solids in the slurry, preferably from 0.05 to 5 wt.-%, more preferably from 0.1 to 3 wt.-%, even more preferably from 0.2 to 2.0 wt.-%, and most preferably from 0.25 to 1.5 wt.-% or from 0.5 to 1.25 wt.-%.

According to one embodiment, the slurry comprises the at least one anionically charged comb polymer in an amount from 0.01 to 10 wt.-%, based on the total weight of the solids in the slurry, preferably from 0.05 to 5 wt.-%, more preferably from 0.1 to 3 wt.-%, even more preferably from 0.2 to 2.0 wt.-%, and most preferably from 0.25 to 1.5 wt.-% or from 0.5 to 1.25 wt.-%.

The at least one anionically charged comb polymer may be used in the aqueous slurry having a solid content from 45 to 82 wt.-%, e.g. from 58 to 81 wt.-%, from 63 to 80 wt.-%, or from 70 to 78 wt.-%, based on the total weight of the aqueous slurry. According to one embodiment, the aqueous slurry has a solid content from 45 to 82 wt.-%, preferably from 60 to 78 wt.-%, and more preferably from 70 to 78 wt.-%, based on the total weight of the aqueous slurry.

The Aqueous Slurry Comprising a Calcium Carbonate Containing Material

The at least one anionically charged comb polymer is used as an anti-deposit agent in an aqueous slurry comprising a calcium carbonate containing material.

According to one embodiment, the calcium carbonate containing material is a ground calcium carbonate, a precipitated calcium carbonate, or a mixture thereof.

A ground calcium carbonate (GCC) may feature, e.g. one or more of marble, limestone, chalk, and/or dolomite. According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing material comprises a wet ground calcium carbonate containing material, the grinding step may be performed under conditions such that autogenous grinding takes place and/or by horizontal ball milling, and/or other such processes known to the skilled man. The wet processed ground calcium carbonate containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

A precipitated calcium carbonate (PCC) may feature, e.g. one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

According to a preferred embodiment of the present invention the at least one calcium carbonate containing material comprises ground calcium carbonate (GCC).

In addition to calcium carbonate, the calcium carbonate containing material may comprise further metal oxides such as titanium dioxide and/or aluminium trioxide, metal hydroxides such as aluminium tri-hydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the calcium carbonate containing material is at least 80 wt.-%, e.g. at least 95 wt.-%, preferably between 97 and 100 wt.-%, more preferably between 98.5 and 99.95 wt.-%, based on the total weight of the calcium carbonate containing material.

According to one embodiment of the present invention, the calcium carbonate containing material has a weight median particle size $d_{50}$ from 0.1 to 100 µm, from 0.25 to 50 µm, or from 0.3 to 5 µm, preferably from 0.4 to 3.0 µm.

According to one aspect of the present invention a deposit and/or corrosion reducing aqueous slurry is provided comprising a calcium carbonate containing material and at least one anionically charged comb polymer, wherein the at least one anionically charged comb polymer has a specific charge from −10 C/g to −250 C/g at pH 8, wherein the Brookfield viscosity of the slurry is from 25 to 5 000 mPa·s at 20° C., and/or the electrical conductivity of the slurry is less than 500 µS/cm at 25° C.

The slurry comprising a calcium carbonate containing material can have a solid content from 45 to 82 wt.-%, e.g. from 58 to 81 wt.-%, from 63 to 80 wt.-%, or from 70 to 78 wt.-%, based on the total weight of the aqueous slurry. According to one embodiment, the aqueous slurry has a solid content from 45 to 82 wt.-%, preferably from 60 to 78 wt.-%, and more preferably from 70 to 78 wt.-%, based on the total weight of the aqueous slurry.

The slurry comprising a calcium carbonate material may have a pH from 7 to 11, preferably from 7.5 and 10.7, and more preferably from 8.5 to 10.3.

According to one embodiment the Brookfield viscosity of the slurry is from 25 to 5 000 mPa·s at 20° C., preferably from 50 to 2 000 mPa·s at 20° C., more preferably from 80 to 1 000 mPa·s at 20° C., and most preferably from 100 to 700 mPa·s at 20° C.

According to one embodiment the electrical conductivity of the slurry is from 50 to 500 µS/cm at 25° C., preferably from 70 to 300 µS/cm at 25° C., more preferably from 80 to 250 µS/cm at 25° C., and most preferably from 100 to 200 µS/cm at 25° C.

According to a preferred embodiment of the present invention, the slurry does not contain an additive having a specific charge of more than −250 C/g at pH 8.

According to a preferred embodiment of the present invention, the slurry consists of a calcium carbonate containing material and at least one anionically charged comb polymer.

According to one embodiment, the at least one anionically charged comb polymer is present in an amount of from 0.01 to 10 wt.-%, based on the total weight of the solids in the slurry, preferably from 0.05 to 5.0 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%.

The deposit and/or corrosion reducing aqueous slurry of the present invention can be used in paper, plastics, paint, and/or agriculture applications.

Method for Producing a Deposit and/or Corrosion Reducing Aqueous Slurry

A method for producing a deposit and/or corrosion reducing aqueous slurry comprises the steps of
a) providing a calcium carbonate containing material,
b) providing water,
c) providing at least one anionically charged comb polymer, wherein the at least one anionically charged comb polymer has a specific charge from −10 C/g to −250 C/g at pH 8, and
d) contacting the calcium carbonate containing material of step a) with the water of step b)
e) contacting the polymer of step c) with the calcium carbonate containing material before and/or during and/or after step d)
wherein the at least one anionically charged comb polymer is added in an amount such that the conductivity of the obtained aqueous slurry is less than 500 µS/cm at 25° C.

According to a further aspect of the present invention, a method for producing calcium carbonate containing composite particles is provided comprising the steps of
a) providing a calcium carbonate containing material,
b) providing water,
c) providing at least one anionically charged comb polymer, wherein the at least one anionically charged comb polymer has a specific charge from −10 C/g to −250 C/g at pH 8, and
d) contacting the calcium carbonate containing material of step a) with the water of step b)
e) contacting the polymer of step c) with the calcium carbonate containing material before and/or during and/or after step d)
wherein the at least one anionically charged comb polymer is added in an amount such that the conductivity of the obtained aqueous slurry is less than 500 µS/cm at 25° C., and
a further step of
f) drying the obtained slurry of step e).

The contacting of the calcium carbonate containing material of step a) with the anionically charged comb polymer of step c) according to method step e) may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to one embodiment of the present invention, method step e) is carried out using a ploughshare mixer.

According to another embodiment of the present invention, method step e) is carried out in a milling device, preferably in a ball mill, preferably in combination with a cyclone device that re-circulates agglomerates and/or aggregates formed during method step e) back to the inlet of the milling device. A cyclone device enables the separation of particulate material such as particles, agglomerates or aggregates, into fractions of smaller and larger particulate material based on gravity.

According to an experimental embodiment, the calcium carbonate containing composite particles formed during method step e) are divided into smaller particles. The term "dividing" as used in the present invention means that particles are split into smaller particles. This may be done by grinding, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-dumper, or a knife cutter. However, any other device that is able to divide the calcium carbonate containing composite particles formed during method step e) into smaller particles may be used.

According to an exemplary embodiment the calcium carbonate containing material of step a) contains a ground calcium carbonate which is obtained by wet grinding a calcium carbonate containing material and step e) is carried out before and/or during and/or after wet grinding the calcium carbonate containing material.

The method step e) may be carried out at room temperature, i.e. at 20° C., or at other temperatures. According to one embodiment of the present invention, method step e) is carried out for at least 1 s, preferably for at least 1 min, e.g. for at least 15 min, 30 min, 1 hour, 2 hours, 4 hours, 6 hours, 8 hours, or 10 hours.

According to one embodiment of the present invention, the anionically charged comb polymer is added in an amount, so that the obtained aqueous slurry has a Brookfield viscosity from 20 to 5 000 mPa·s at 20° C. and/or an electrical conductivity from 50 to 500 µS/cm at 25° C. Preferably the Brookfield viscosity is from 50 to 2 000 mPa·s, more preferably from 80 to 1 000 mPa·s at 20° C., most preferably from 100 to 700 mPa·s at 20° C., and/or the electrical conductivity of the slurry is from 70 to 300 µS/cm at 25° C., more preferably from 80 to 250 µS/cm at 25° C., and most preferably from 100 to 200 µS/cm at 25° C.

To obtain the calcium carbonate containing composite particles of the present invention, the slurry obtained according to the inventive method described above may be dried according to step f) with any suitable method known in the art. The calcium carbonate containing slurry may be dried, for example, thermally, e.g. by means of a spray drier or a microwave or in an oven, or mechanically, e.g. by filtration, or lowering the water content. The inventive calcium carbonate containing composite particles can be mixed with water to obtain the inventive deposit and/or corrosion reducing aqueous slurry.

The scope and interest of the invention will be better understood based on the following examples which are intended to illustrate certain embodiments of the invention and are non-limitative.

EXAMPLES

1. Measurement Methods pH Measurement

The pH is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Viscosity Measurement

The Brookfield viscosity was measured after 1 minute of stirring by the use of a RVT model Brookfield™ viscometer at a temperature of 20° C., and a rotation speed of 100 rpm (revolutions per minute) with the appropriate disc spindle from No 1 to 5.

Electrical Conductivity Measurement

The conductivity of a suspension was measured at 25° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a Pendraulik tooth disc stirrer.

The instrument was first calibrated in the relevant conductivity range using commercially available conductivity calibration solutions from Mettler Toledo. The influence of temperature on conductivity was automatically corrected by the linear correction mode.

Measured conductivities are reported for the reference temperature of 25° C. The reported conductivity values are the endpoint values detected by the instrument (the endpoint is when the measured conductivity differs by less than 0.4% from the average over the last 6 seconds).

Particle Size Distribution (Mass % Particles with a Diameter<X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Sedigraph™ 5120.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Weight Solids (Wt. %) of a Material in Suspension

The weight solids were determined by dividing the weight of the solid material by the total weight of the aqueous suspension. The weight solids content was determined using a Moisture Analyser MJ 33, Mettler Toledo.

Specific Surface (BET) Measurement

The specific surface area (in $m^2/g$) of the mineral filler was determined using the BET method, which is well known to the skilled man (ISO 9277:1995). The total surface area (in $m^2$) of the mineral filler was then obtained by multiplication of the specific surface area and the mass (in g) of the mineral filler. The method and the instrument are known to the skilled person and are commonly used to determine specific surface of fillers and pigments.

Specific Charge (C/g)

The cationic polymer demand that is necessary to achieve a charge value of zero was measured using the Mettler DL 77 titrator and the Mütec PCD-02 detector by means of the cationic titration method. The cationic reagent was N/200 (0.005 N) methyl glycol chitosan (chitosan), and the anionic reagent was N/400 (0.0025 N) K-polyvinyl-sulfate (KPVS), both sold by WAKO Chemicals GmbH.

If necessary, the sample was adjusted to pH 8.0+/−0.1 with NaOH (0.1M) prior to measurement.

Since experience showed that the first titration is not correct, 10 ml water were first prepared in the detector followed by the addition of 0.5 ml KPVS. Afterwards, titration with chitosan was made until it is back to shortly after the equivalence point. Subsequently, the measurements were started. Between 0.5 and 2.0 ml of 0.005 molar reagent were used up during the titration to obtain reproducible values.

To avoid rapid sedimentation, the sample was drawn under stirring, by means of a tared syringe. The content of the syringe was then rinsed into the sample vessel by means of distilled water. Afterwards, the detector was filled with distilled water up to the lower edge and the piston was inserted carefully. Subsequently, the cationic titration solution was put on the memotitrator and the top of the burette was fixed at the detector ensuring that it does not come into contact with the detector or the liquid. After each titration, the development of the titration was verified with the aid of the titration curve.

Calculation of the Electrochemical Charge:

$$\text{Charge}[\mu\text{Val/g}] = \frac{V \cdot c \cdot z \cdot t}{E \cdot F} \cdot K$$

wherein K=+1 000

V: Consumption chitosan [ml]
c: Concentration chitosan [mol/l]
t: Titer factor chitosan
E: Weight-in quantity [g]
F: Mass fraction solids [g/g]
z: Valence (equivalence number)

The obtained charge value of µVal/g was converted into C/g by multiplication with the Faraday constant as follows:

$$[C/g] = [\mu\text{Val/g}] \cdot 0.096485$$

Intrinsic Viscosity

The intrinsic viscosity was determined by a Schott AVS 350 system. The samples were dissolved in an aqueous 6 wt.-% NaCl solution, adjusted to pH 10 using NaOH. Measurements were performed at 25° C. with a capillary type 0a and corrected using the Hagenbach correction.

2. Additives

Additive A (comparative):
Sodium/magnesium polyacrylate as described in U.S. Pat. No. 4,868,228
  Specific charge: −931 C/g measured at pH 8
  Mw=6 000 g/mol (polydispersity: 2.6)
  Intrinsic viscosity: 6.8 ml/g
Additive B (inventive):
ViscoCrete-3082, available from SIKA, Switzerland.
  Specific charge: −0.3 C/g measured at pH 4.6 and −99 C/g measured at pH 8
  Intrinsic viscosity: 19.6 ml/g
  Acid number: 29.6 mg KOH/g
  Saponification number: 30.5 mg KOH/g
Additive C (inventive):
MelPers 0045, available from BASF, Germany.
  Specific charge: −49 C/g measured at pH 5.9 and −69 C/g measured at pH 8
  Intrinsic viscosity: 30.3 ml/g
Additive D (inventive):
Ethacryl M (Lyondell Chemical Company), a commercially available comb-based copolymer which is an ethoxylated acrylic acid polymer (CAS 536754-81-1) 2-propenoic acid, 2-methyl-, polymer with 2-methyloxirane polymer with oxirane ether with 1,2-propanediol mono(2-methyl-2-propenoate) (1:1), sodium salt)
  Specific charge: −115 C/g measured at pH 7.2 and −130 C/g measured at pH 8,
  Intrinsic viscosity: 57.9 ml/g
  Acid number: 5.6 mg KOH/g
  Saponification number: 8.9 mg KOH/g
Additive E (comparative):
Comb polymer composed of acrylic-polyethylene oxide ester and metacrylic acid.
  Specific charge: −286 C/g measured at pH 7.6 and −294 C/g measured at pH 8.0
  Intrinsic viscosity: 38.2 ml/g 3. Examples Example 1

Comparative Example

A natural calcium carbonate of Norwegian origin is obtained by first autogenously dry grinding 10 to 300 mm calcium carbonate rocks to a fineness corresponding to a $d_{50}$ value of between 42 to 48 μm, and subsequently wet grinding this dry-ground product at 30 to 35° C. in water in a 1.4-liter vertical attritor mill (Dynomill) at a weight solids content of between 75 and 76 wt.-%, based on the total weight of the slurry, until 60 wt.-% of the particles have a diameter<2 μm, 33 wt.-% have a diameter of <1 μm, 8 wt.-% have a diameter<0.2 μm, and a $d_{50}$ value of 1.4 μm was reached.

During the grinding processes, 0.45 wt.-%, based on the total weight of solids in the slurry, of additive A was added to obtain a viscosity between 100 and 500 mPa·s. 70 Mol-% of the carboxylic groups of the additive A contained sodium ions as counter ions and 30 Mol-% calcium ions. The specific surface of the finally ground calcium carbonate was 6.9 m²/g.

Example 2

Comparative Example

A natural calcium carbonate of Norwegian origin obtained by first autogenously dry grinding 10 to 300 mm calcium carbonate rocks to a fineness corresponding to a $d_{50}$ of between 42 to 48 μm, and subsequently wet grinding this dry-ground product in water at 40 to 45° C. in a 1.4-liter vertical attritor mill (Dynomill) at a weight solids content of between 75 and 76 wt.-%, based on the total weight of the slurry, until 90 wt. % of the particles have a diameter<2 μm, 63 wt.-% have a diameter of <1 μm, 15 wt.-% have a diameter<0.2 μm, and a $d_{50}$ value of 0.75 μm was reached.

During the grinding processes, 0.65 wt.-%, based on the total weight of solids in the slurry, of additive A was added to obtain a viscosity between 100 and 500 mPa·s. 50 Mol-% of the carboxylic groups of the additive A contained sodium ions as counter ions and 50 Mol-% magnesium ions. The specific surface of the finally ground calcium carbonate was 11.4 m²/g.

Example 3

A natural calcium carbonate of Norwegian origin obtained by first autogenously dry grinding 10 to 300 mm calcium carbonate rocks to a fineness corresponding to a $d_{50}$ of between 42 to 48 μm, and subsequently wet grinding this dry-ground product in water in a 1.4-liter vertical attritor mill (Dynomill) at a weight solids content of between 75 and 76 wt.-%, based on the total weight of the slurry, until 60 wt.-% of the particles have a diameter<2 μm, 33 wt.-% have a diameter of <1 μm, 8 wt.-% have a diameter<0.2 μm, and a $d_{50}$ value of 1.4 μm was reached.

During the grinding processes, 0.42 wt.-%, based on the total weight of solids in the slurry, of additive B was added. The slurry had a viscosity between 100 and 500 mPa·s, and the specific surface of the finally ground calcium carbonate was 6.2 m²/g.

Example 4

A natural calcium carbonate of Norwegian origin obtained by first autogenously dry grinding 10 to 300 mm calcium carbonate rocks to a fineness corresponding to a $d_{50}$ of between 42 to 48 μm, and subsequently wet grinding this dry-ground product in water in a 1.4-liter vertical attritor mill (Dynomill) at a weight solids content of between 75 and 76 wt.-%, based on the total weight of the slurry, until 90 wt.-% of the particles have a diameter<2 μm, 63 wt.-% have a diameter of <1 μm, 15 wt.-% have a diameter of <0.2 μm, and a $d_{50}$ value of 0.75 μm was reached.

Before and during the grinding processes, in total 0.9 wt.-%, based on the weight of solids in the slurry, of additive B was added. The slurry had a viscosity between 100 and 500 mPa·s, and the specific surface of the finally ground calcium carbonate was 12.2 m²/g.

Example 5

A natural calcium carbonate of Norwegian origin obtained by first autogenously dry grinding 10 to 300 mm calcium carbonate rocks to a fineness corresponding to a $d_{50}$ of between 42 to 48 μm, and subsequently wet grinding this dry-ground product in water at 40 to 45° C. in a 1.4-liter vertical attritor mill (Dynomill) at a weight solids content of between 76 and 77 wt.-%, based on the total weight of the slurry, until 92 wt.-% of the particle have a diameter<2 μm, 64 wt.-% have a diameter of <1 μm, 13 wt.-% of particle have a diameter<0.2 μm, and a $d_{50}$ value of 0.72 μm was reached.

Before and during the grinding processes, in total 0.81 wt.-%, based on the total weight of solids in the slurry, of additive C was added. The slurry had a viscosity between 100 and 500 mPa·s, and the specific surface of the finally ground calcium carbonate was 11.6 m²/g.

Example 6

A precipitated scalenohedral calcium carbonate obtained by reaction of calcium hydroxide and carbon dioxide at a temperature of 65 to 95° C. at a weight solids content of between 15 and 17 wt.-% was concentrated by a filter press to a filter cake with a solids content with 53 wt.-%, based on the total weight of the slurry. The slurry was mixed with 1.0 wt.-%, based on the total weight of solids in the slurry, of additive B. The slurry had a viscosity between 100 and 500 mPa·s. The scalenohedral calcium carbonate has a $d_{50}$ of 1.8 μm and specific surface area of 5.5 m²/g.

Example 7

A precipitated scalenohedral calcium carbonate obtained by reaction of calcium hydroxide and carbon dioxide at a temperature of 65 to 95° C. at a weight solids content of between 15 and 17 wt.-% was concentrated by a filter press to a filter cake with a solids content with 50 wt.-%, based on the total weight of the slurry. The slurry was mixed with 0.25 wt.-%, based on the total weight of solids in the slurry, of additive D. The slurry had a viscosity between 100 and 500 mPa·s. The scalenohedral calcium carbonate has a $d_{50}$ of 1.8 μm and specific surface area of 5.5 m²/g.

Example 8

Comparative Example

A natural calcium carbonate of Norwegian origin obtained by first autogenously dry grinding 10 to 300 mm calcium carbonate rocks to a fineness corresponding to a $d_{50}$ value of between 42 to 48 μm, and subsequently wet grinding this dry-ground product in water at 30 to 35° C. in a 1.4-liter vertical attritor mill (Dynomill) at a weight solids content of between 75 and 76 wt.-%, based on the total weight of the slurry, until 88 wt.-% of the particles have a diameter<2 μm, and a $d_{50}$ value of 0.72 μm and a $d_{98}$ value of 3.31 μm was reached.

During the grinding processes, 1.08 wt.-%, based on the total weight of solids in the slurry, of additive E was added to obtain a viscosity between 100 and 500 mPa·s. The final viscosity after grinding was 204 mPa·s and the pH was 9.0.

Example 9

A precipitated scalenohedral calcium carbonate obtained by reaction of calcium hydroxide and carbon dioxide at a temperature of 65 to 95° C. at a weight solids content of between 15 and 17 wt.-% was concentrated by a filter press to a filter cake with a solids content with 50 wt.-%, based on the total weight of the slurry. The slurry was mixed with 0.25 wt.-%, based on the total weight of solids in the slurry, of additive D. The slurry had a viscosity between 100 and 500 mPa·s. The scalenohedral calcium carbonate has a $d_{50}$ of 1.8 μm and specific surface area of 5.5 m²/g.

Example 10

Comparative Example

The conductivity of the slurry of Example 9 was increased by adding under agitation traces of 10 wt.-% NaCl solution until a conductivity between 1500 and 1700 μS/cm was reached.

Example 11

Samples of the slurries of Examples 1 to 10 were filled into 500 ml plastic cups. Two electrodes were dipped into the slurry, wherein the electrodes had a width of 30 mm. The immersion depth of the electrodes was 65 mm, and the distance between both electrodes was 30 mm. A laboratory power supply was used as power source for the electrolysis. The DC voltage was tunable from 0 to 35 V. The amperage was set to maximum so that as much electrical current could flow as was possible according to the surface of the electrodes (19.5 cm²) and the electrical conductivity of the slurry.

For the slurries of Examples 1 to 6, and 8 to 10 stainless steel electrodes were used, and for the slurry of Example 7, a positive copper electrode and negative stainless steel electrode were used. The obtained results are compiled in Table 1 below.

TABLE 1

Results of deposit measurements

| Example | Brookfield viscosity (mPa·s) | Electrical conductivity (μS/cm) | Voltage/ Amperage (V/mA) | Deposit after 10 min (g) | additive amount (wt.-%) |
|---|---|---|---|---|---|
| 1 (comparative) | 110 | 550 | 5/10 | 11.24 | 0.34 |
| 2 (comparative) | 129 | 988 | 5/23 | 7.87 (visible corrosion of anode) | 0.79 |
| 3a | 210 | 155 | 5/4 | <0.1 | 0.42 |
| 3b | 210 | 155 | 10/11 | <0.1 | 0.42 |
| 3c | 210 | 155 | 20/23 | <0.1 | 0.42 |
| 4a | 472 | 174 | 5/4 | <0.1 | 0.90 |
| 4b | 472 | 174 | 20/25 | <0.1 | 0.90 |
| 4c | 472 | 174 | 35/50 | <0.1 | 0.90 |
| 5a | 366 | 184 | 5/7 | <0.1 | 0.81 |
| 5b | 366 | 184 | 20/45 | <0.1 | 0.81 |
| 5c | 366 | 184 | 35/75 | <0.1 | 0.81 |
| 6 | 382 | 435 | 35/102 | <0.1 | 1.00 |
| 7 | 382 | 435 | 5/12 | <0.1 | 0.25 |
| 8 (comparative) | 204 | 680 | 35/210 | >>0.1 (corrosion of anode) | 1.08 |
| 9 | 382 | 435 | 35/151 | <0.1 | 0.25 |
| 10 (comparative) | 850 | 1 625 | 5/40 | >>0.1 | 0.25 |

The results compiled in the table above show that already at a voltage of only 5 V and at very low amperage of only some mA the aqueous slurries of comparative Examples 1 and 2 lead to high deposits on the anode in short time. Comparative examples 8 and 10 showed also a significant amount of deposits on the anode at high voltage. In addition, comparative examples 2 and 8 lead to visible corrosion of the anode.

The slurries of the inventive examples 3 to 7, and 9 show substantially no solid deposit on the anode even at increased voltage (V) and amperage (mA) after 10 min. Furthermore, none of the inventive examples 3 to 7, and 9 show corrosion of the anode after 10 min.

The invention claimed is:

1. A method of making a slurry comprising a calcium carbonate containing material comprising introducing at least one anionically charged comb polymer as an anti-deposit agent in an aqueous slurry comprising a calcium carbonate containing material,
wherein the at least one anionically charged comb polymer has a specific charge from −10 C/g to −250 C/g at pH 8,
wherein the electrical conductivity of the slurry comprising the at least one anionically charged comb polymer is less than 500 μS/cm at 25° C., and
wherein the slurry has a solid content from 45 to 82 wt.-%, based on the total weight of the aqueous slurry.

2. The method of claim 1, wherein the at least one anionically charged comb polymer has a specific charge from −10 C/g to −100 g/C at pH 8.

3. The method of claim 1, wherein the calcium carbonate containing material is a ground calcium carbonate, a precipitated calcium carbonate, or a mixture thereof.

4. The method of claim 1, wherein the calcium carbonate containing material has a weight median particle size $d_{50}$ from 0.25 to 50 μm.

5. The method of claim 1, wherein the calcium carbonate containing material has a weight median particle size $d_{50}$ from 0.4 to 3.0 μm.

6. The method of claim 1, wherein the slurry has a solid content from 70 to 78 wt.-%, based on the total weight of the aqueous slurry.

7. The method of claim 1, wherein the at least one anionically charged comb polymer comprises structural units of formula (I)

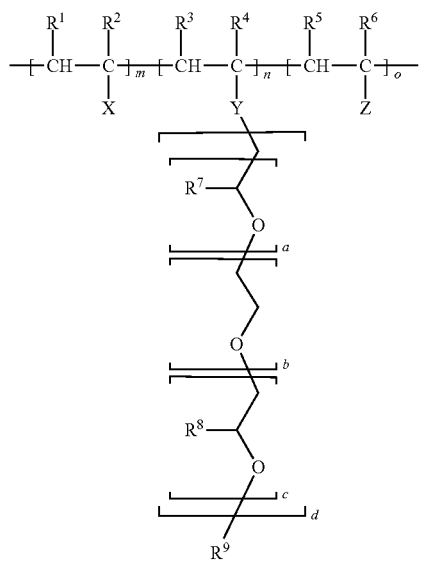

wherein $R^1$, $R^2$, $R^3$, $R^4$, $R^5$ and $R^6$ are independently selected from hydrogen or alkyl groups having 1 to 40 carbon atoms,
X is a negatively charged functional group,
Y represents a functional linkage group, which is independently selected from the group consisting of ether, ester, and amide groups,
Z is a positively charged functional group,
$R^7$ and $R^8$ are independently selected from hydrogen or alkyl groups having 1 to 4 carbon atoms,
$R^9$ is selected from hydrogen or an alkyl group having 1 to 40 carbon atoms,
a, b, c and d are integers having a value from 5 to 150, and at least one of a, b, c or d has a value of greater than 0, and
n, m and o are selected so that the anionically charged polymer has a specific charge from −10 C/g to −250 C/g at pH 8.

8. The method of claim 1, wherein the slurry comprises the at least one anionically charged comb polymer in amount from 0.2 to 2.0 wt.-%, based on the total weight of the solids in the slurry.

9. The method of claim 1, wherein the Brookfield viscosity of the slurry comprising the at least one anionically charged comb polymer is from 25 to 5000 mPa·s at 20° C.

10. The method of claim 1, wherein the electrical conductivity of the slurry comprising the at least one anionically charged comb polymer is from 50 to 500 μS/cm at 25° C.

11. The method of claim 1, wherein the slurry forms a reduced amount of deposits on an electrically conductive surface compared to a slurry not containing an anionically charged comb polymer but having the same solids content and viscosity when the slurry is in contact with at least two electrically conductive surfaces having different standard electrode potentials or is exposed to a direct-current (DC) electrical field for the same time period.

12. The method of claim 1, wherein the slurry forms an amount of deposits on an electrically conductive surface, which is less than 10 wt.-% of the deposit amount formed by a slurry not containing an anionically charged comb polymer but having the same solids content and viscosity when the slurry is in contact with at least two electrically conductive surfaces having different standard electrode potentials or is exposed to a DC electrical field for the same time period.

13. The method of claim 1, wherein the slurry forms an amount of deposits on an electrically conductive surface, which is less than 1 wt.-% of the deposit amount formed by a slurry not containing an anionically charged comb polymer but having the same solids content and viscosity when the slurry is in contact with at least two electrically conductive surfaces having different standard electrode potentials or is exposed to a DC electrical field for the same time period.

14. The method of claim 1, wherein the slurry does not form any deposits on an electrically conductive surface when the slurry is in contact with at least two electrically conductive surfaces having different standard electrode potentials or is exposed to a DC electrical field.

15. The method of claim 14, wherein the DC voltage of the electrical field is from 1 to 50 mV and/or the amperage is from 0.1 to 250 mA.

16. A deposit and/or corrosion reducing aqueous slurry comprising
a calcium carbonate containing material, and
at least one anionically charged comb polymer,
wherein the anionically charged comb polymer has a specific charge from −10 C/g to −250 C/g at pH 8,
wherein the Brookfield viscosity of the slurry is from 25 to 5 000 mPa·s at 20° C., and the electrical conductivity of the slurry is less than 500 μS/cm at 25° C., and wherein the slurry has a solid content from 45 to 82 wt.-% based on the total weight of the aqueous slurry.

17. The deposit and/or corrosion reducing aqueous slurry of claim 16, wherein the at least one anionically charged comb polymer is present in an amount of from 0.01 to 10 wt.-%, based on the total weight of the solids in the slurry.

18. The deposit and/or corrosion reducing aqueous slurry of claim 16, wherein the at least one anionically charged comb polymer is present in an amount of from 0.25 to 1.5 wt.-%, based on the total weight of the solids in the slurry.

19. The deposit and/or corrosion reducing aqueous slurry of claim 16, wherein the at least one anionically charged comb polymer is present in an amount of from 0.5 to 1.25 wt.-%, based on the total weight of the solids in the slurry.

20. The deposit and/or corrosion reducing aqueous slurry of claim 16, wherein the aqueous slurry has a solid content from 70 to 78 wt.-%, based on the total weight of the aqueous slurry.

21. A method for producing a deposit and/or corrosion reducing aqueous slurry comprising the steps of
    a) providing a calcium carbonate containing material,
    b) providing water,
    c) providing at least one anionically charged comb polymer, wherein the at least one anionically charged comb polymer has a specific charge from −10 C/g to −250 C/g at pH 8,
    d) contacting the calcium carbonate containing material of step a) with the water of step b),
    e) contacting the polymer of step c) with the calcium carbonate containing material before and/or during and/or after step d),
    wherein the at least one anionically charged comb polymer is added in an amount such that the conductivity of the obtained aqueous slurry is less than 500 µS/cm at 25° C., and
    wherein the slurry has a solid content from 45 to 82 wt.-%, based on the total weight of the aqueous slurry.

22. A method for producing calcium carbonate containing composite particles comprising obtaining the slurry resulting from step e) of claim 21, and drying the slurry.

23. The method according to the claim 21, wherein the at least one anionically charged comb polymer is added in an amount so that the obtained aqueous slurry has a Brookfield viscosity from 25 to 5000 mPa·s at 20° C.

24. The method according to claim 21, wherein the at least one anionically charged comb polymer is present in an amount of from 0.01 to 10 wt.-%, based on the total weight of the solids in the slurry.

25. The method according to claim 21, wherein the at least one anionically charged comb polymer is present in an amount of from 0.25 to 1.5 wt.-%, based on the total weight of the solids in the slurry.

26. The method according to claim 21, wherein the at least one anionically charged comb polymer is present in an amount of from 0.5 to 1.25 wt.-%, based on the total weight of the solids in the slurry.

27. The method according to claim 21, wherein the aqueous slurry has a solid content from 70 to 78 wt.-%, based on the total weight of the slurry.

28. Paper, plastic, paint or agriculture product comprising the deposit and/or corrosion reducing slurry of claim 16.

* * * * *